United States Patent
Womack et al.

(10) Patent No.: US 9,923,628 B2
(45) Date of Patent: Mar. 20, 2018

(54) SYSTEM AND METHOD FOR RELAY NODE SELECTION

(71) Applicant: BlackBerry Limited, Waterloo (CA)

(72) Inventors: James Earl Womack, Bedford, TX (US); Yi Yu, Irving, TX (US); Zhijun Cai, Ashburn, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 19 days.

(21) Appl. No.: 14/878,613

(22) Filed: Oct. 8, 2015

(65) Prior Publication Data

US 2016/0028473 A1 Jan. 28, 2016

Related U.S. Application Data (63) Continuation of application No. 13/865,810, filed on Apr. 18, 2013, now Pat. No. 9,191,878, which is a
(Continued)

(51) Int. Cl.
| | |
|---|---|
| *H04B 3/36* | (2006.01) |
| *H04B 7/14* | (2006.01) |
| *H04B 7/26* | (2006.01) |
| *H04W 36/08* | (2009.01) |
| *H04W 48/00* | (2009.01) |
| *H04B 17/318* | (2015.01) |
| *H04W 76/02* | (2009.01) |
| *H04B 7/155* | (2006.01) |
| *H04W 48/20* | (2009.01) |
| *H04W 84/04* | (2009.01) |

(52) U.S. Cl.
CPC ....... *H04B 7/2606* (2013.01); *H04B 7/15507* (2013.01); *H04B 17/318* (2015.01); *H04W 36/08* (2013.01); *H04W 48/00* (2013.01); *H04W 76/023* (2013.01); *H04W 48/20* (2013.01); *H04W 84/047* (2013.01)

(58) Field of Classification Search
CPC ... H04W 48/20; H04W 72/08; H04W 84/047; H04W 36/08; H04W 48/00; H04W 52/262; H04W 72/082; H04W 72/1226; H04W 76/023
USPC ............. 455/7, 522; 370/338, 331, 315, 254
See application file for complete search history.

(56) References Cited

U.S. PATENT DOCUMENTS

| | | |
|---|---|---|
| 6,014,375 A | 1/2000 | Janky |
| 6,512,745 B1 | 1/2003 | Abe et al. |

(Continued)

FOREIGN PATENT DOCUMENTS

| | | |
|---|---|---|
| CN | 1941666 A | 4/2007 |
| CN | 1960352 A | 5/2007 |

(Continued)

OTHER PUBLICATIONS

Office Action dated May 23, 2014; U.S. Appl. No. 13/716,839, filed Dec. 17, 2012; 76 pages.

(Continued)

*Primary Examiner* — Shaima Q Aminzay
(74) *Attorney, Agent, or Firm* — Conley Rose, P.C.; J. Robert Brown, Jr.; Albert A. Abbou (57) ABSTRACT

A method for recommending a relay node to which a user agent attaches. The method includes recommending the relay node based on a relay node selection rank.

20 Claims, 4 Drawing Sheets

Related U.S. Application Data continuation of application No. 12/340,418, filed on Dec. 19, 2008, now Pat. No. 8,446,856.

(56) References Cited

U.S. PATENT DOCUMENTS

| | | | |
|---|---|---|---|
| 6,690,657 | B1 | 2/2004 | Lau et al. |
| 6,785,510 | B2 | 8/2004 | Larsen |
| 7,054,633 | B2 | 5/2006 | Seo et al. |
| 7,061,879 | B2 | 6/2006 | Oprescu-Surcobe et al. |
| 7,130,614 | B2 | 10/2006 | Sreemanthula et al. |
| 7,227,851 | B1 | 6/2007 | Gopalakrishnan et al. |
| 7,349,665 | B1 | 3/2008 | Zhu et al. |
| 7,386,036 | B2 * | 6/2008 | Pasanen ............... H04W 88/06 370/293 |
| 7,564,827 | B2 | 7/2009 | Das et al. |
| 7,577,124 | B2 | 8/2009 | Yomo et al. |
| 7,602,843 | B2 | 10/2009 | Cho et al. |
| 7,673,211 | B2 | 3/2010 | Meyer et al. |
| 7,706,408 | B2 | 4/2010 | Takagi et al. |
| 7,724,767 | B2 | 5/2010 | Oksman |
| 7,742,448 | B2 | 6/2010 | Ramachandran et al. |
| 7,830,837 | B2 | 11/2010 | Park et al. |
| 7,873,002 | B2 | 1/2011 | Cai |
| 7,898,948 | B2 | 3/2011 | DiGirolamo et al. |
| 8,040,904 | B2 | 10/2011 | Cai et al. |
| 8,072,918 | B2 | 12/2011 | Muharemovic et al. |
| 8,121,552 | B2 | 2/2012 | Agami et al. |
| 8,175,014 | B2 | 5/2012 | Terry et al. |
| 8,228,851 | B2 | 7/2012 | Wu |
| 8,234,534 | B2 | 7/2012 | Park et al. |
| 8,265,016 | B2 | 9/2012 | Xu |
| 8,265,128 | B2 | 9/2012 | Yu et al. |
| 8,281,211 | B2 | 10/2012 | Wang et al. |
| 8,311,061 | B2 | 11/2012 | Yu et al. |
| 8,335,466 | B2 | 12/2012 | Cai et al. |
| 8,355,388 | B2 | 1/2013 | Womack et al. |
| 8,391,202 | B2 | 3/2013 | Courseille |
| 8,402,334 | B2 | 3/2013 | Yu et al. |
| 8,428,016 | B2 | 4/2013 | Bhattad et al. |
| 8,446,856 | B2 | 5/2013 | Womack et al. |
| 8,576,882 | B2 | 11/2013 | Zhang et al. |
| 8,605,674 | B2 | 12/2013 | Park et al. |
| 8,699,547 | B2 | 4/2014 | Yu et al. |
| 8,824,359 | B2 | 9/2014 | Cai et al. |
| 8,837,303 | B2 | 9/2014 | Yu et al. |
| 8,848,594 | B2 | 9/2014 | Womack et al. |
| 8,856,607 | B2 | 10/2014 | Yu et al. |
| 9,191,878 | B2 | 11/2015 | Womack et al. |
| 2002/0032032 | A1 | 3/2002 | Haumont et al. |
| 2002/0155839 | A1 | 10/2002 | Nisbet |
| 2002/0187746 | A1 | 12/2002 | Cheng et al. |
| 2003/0096631 | A1 | 5/2003 | Kayama et al. |
| 2003/0101274 | A1 | 5/2003 | Yi et al. |
| 2003/0103480 | A1 | 6/2003 | You et al. |
| 2004/0042492 | A1 | 3/2004 | Suzuki et al. |
| 2004/0063451 | A1 | 4/2004 | Bonta et al. |
| 2004/0266339 | A1 | 12/2004 | Larsson |
| 2005/0014464 | A1 | 1/2005 | Larsson |
| 2005/0037798 | A1 | 2/2005 | Yamashita et al. |
| 2005/0042987 | A1 | 2/2005 | Lee et al. |
| 2005/0148311 | A1 | 7/2005 | Anderson |
| 2005/0232212 | A1 * | 10/2005 | Kang ............... H04W 36/0061 370/338 |
| 2006/0183421 | A1 | 8/2006 | Proctor, Jr. et al. |
| 2006/0239455 | A1 | 10/2006 | Kato |
| 2007/0002766 | A1 | 1/2007 | Park et al. |
| 2007/0058661 | A1 | 3/2007 | Chow |
| 2007/0070953 | A1 | 3/2007 | Yoon et al. |
| 2007/0081483 | A1 | 4/2007 | Jang et al. |
| 2007/0082621 | A1 | 4/2007 | Lee et al. |
| 2007/0086387 | A1 * | 4/2007 | Kang ............... H04B 7/2606 370/331 |
| 2007/0097945 | A1 | 5/2007 | Wang et al. |
| 2007/0104148 | A1 | 5/2007 | Kang et al. |
| 2007/0153734 | A1 | 7/2007 | Lee et al. |
| 2007/0155315 | A1 | 7/2007 | Lee et al. |
| 2007/0171925 | A1 | 7/2007 | Tanimoto |
| 2007/0206531 | A1 | 9/2007 | Pajukoski et al. |
| 2007/0230605 | A1 | 10/2007 | Osseiran et al. |
| 2007/0253421 | A1 | 11/2007 | Cai |
| 2007/0274250 | A1 | 11/2007 | Chen et al. |
| 2007/0287476 | A1 | 12/2007 | Jeong et al. |
| 2007/0291696 | A1 | 12/2007 | Zhang et al. |
| 2008/0002610 | A1 | 1/2008 | Zheng et al. |
| 2008/0025248 | A1 | 1/2008 | Naden |
| 2008/0025323 | A1 | 1/2008 | Khan |
| 2008/0043671 | A1 | 2/2008 | Moon et al. |
| 2008/0043710 | A1 | 2/2008 | Zhou et al. |
| 2008/0056173 | A1 | 3/2008 | Watanbe |
| 2008/0081628 | A1 | 4/2008 | Ye et al. |
| 2008/0089282 | A1 | 4/2008 | Malladi et al. |
| 2008/0101306 | A1 | 5/2008 | Bertrand et al. |
| 2008/0101498 | A1 | 5/2008 | Han et al. |
| 2008/0102794 | A1 | 5/2008 | Keevill et al. |
| 2008/0107072 | A1 | 5/2008 | Viorel et al. |
| 2008/0107076 | A1 | 5/2008 | Ramachandran et al. |
| 2008/0107078 | A1 | 5/2008 | Viorel et al. |
| 2008/0108303 | A1 | 5/2008 | Okuda |
| 2008/0108304 | A1 | 5/2008 | Suga |
| 2008/0159337 | A1 | 7/2008 | Lee |
| 2008/0165776 | A1 | 7/2008 | Tao et al. |
| 2008/0174470 | A1 | 7/2008 | Lum et al. |
| 2008/0212513 | A1 | 9/2008 | Tao et al. |
| 2008/0225765 | A1 | 9/2008 | Marinier et al. |
| 2008/0225772 | A1 | 9/2008 | Xu |
| 2008/0227449 | A1 | 9/2008 | Gholmieh et al. |
| 2008/0227461 | A1 | 9/2008 | Dayal et al. |
| 2008/0232284 | A1 | 9/2008 | Dalsgaard et al. |
| 2008/0232493 | A1 | 9/2008 | Zhang et al. |
| 2008/0247375 | A1 | 10/2008 | Muharemovic et al. |
| 2008/0285500 | A1 | 11/2008 | Zhang et al. |
| 2008/0285501 | A1 | 11/2008 | Zhang et al. |
| 2008/0293358 | A1 | 11/2008 | Andersson et al. |
| 2008/0310389 | A1 | 12/2008 | Suzuki et al. |
| 2008/0311904 | A1 | 12/2008 | Courseille |
| 2009/0010199 | A1 | 1/2009 | Adachi et al. |
| 2009/0046641 | A1 | 2/2009 | Wang et al. |
| 2009/0061892 | A1 | 3/2009 | Lee et al. |
| 2009/0061920 | A1 | 3/2009 | Horiuchi et al. |
| 2009/0111476 | A1 | 4/2009 | Hamalainen et al. |
| 2009/0116423 | A1 | 5/2009 | Ni et al. |
| 2009/0154533 | A1 | 6/2009 | Khayrallah et al. |
| 2009/0190522 | A1 | 7/2009 | Horn et al. |
| 2009/0191882 | A1 | 7/2009 | Kovacs et al. |
| 2009/0196177 | A1 | 8/2009 | Teyeb et al. |
| 2009/0196332 | A1 | 8/2009 | Miyatani |
| 2009/0239568 | A1 | 9/2009 | Bertrand et al. |
| 2009/0252079 | A1 | 10/2009 | Zhang et al. |
| 2009/0252088 | A1 | 10/2009 | Rao et al. |
| 2009/0264077 | A1 | 10/2009 | Damnjanovic |
| 2009/0276672 | A1 | 11/2009 | Lee et al. |
| 2009/0291679 | A1 | 11/2009 | Wu |
| 2009/0303918 | A1 | 12/2009 | Ma et al. |
| 2009/0313518 | A1 | 12/2009 | Shen et al. |
| 2009/0325480 | A1 | 12/2009 | Ji et al. |
| 2009/0325618 | A1 | 12/2009 | Aiba et al. |
| 2010/0003977 | A1 | 1/2010 | Pinheiro et al. |
| 2010/0005351 | A1 | 1/2010 | Ahn et al. |
| 2010/0027457 | A1 | 2/2010 | Okuda |
| 2010/0027458 | A1 | 2/2010 | Wu et al. |
| 2010/0039947 | A1 | 2/2010 | Li et al. |
| 2010/0046413 | A1 | 2/2010 | Jin et al. |
| 2010/0046418 | A1 | 2/2010 | Horn et al. |
| 2010/0056197 | A1 | 3/2010 | Attar et al. |
| 2010/0061361 | A1 | 3/2010 | Wu |
| 2010/0074209 | A1 | 3/2010 | Montojo et al. |
| 2010/0080166 | A1 | 4/2010 | Palanki et al. |
| 2010/0091759 | A1 | 4/2010 | Stahl et al. |
| 2010/0098045 | A1 | 4/2010 | Miyazaki |
| 2010/0103845 | A1 | 4/2010 | Ulupinar et al. |
| 2010/0110967 | A1 | 5/2010 | Sartori et al. |
| 2010/0120442 | A1 | 5/2010 | Zhuang et al. |
| 2010/0131814 | A1 | 5/2010 | Chiu |

(56) References Cited

U.S. PATENT DOCUMENTS

| | | | |
|---|---|---|---|
| 2010/0135231 A1 | 6/2010 | Harada et al. |
| 2010/0135251 A1 | 6/2010 | Sambhwani et al. |
| 2010/0150022 A1 | 6/2010 | Cai et al. |
| 2010/0182992 A1 | 7/2010 | Chun et al. |
| 2010/0184434 A1 | 7/2010 | Jeong et al. |
| 2010/0202307 A1 | 8/2010 | Lee et al. |
| 2010/0271999 A1 | 10/2010 | Yu et al. |
| 2010/0296431 A1 | 11/2010 | Terry et al. |
| 2010/0297993 A1 | 11/2010 | Heo et al. |
| 2010/0302998 A1 | 12/2010 | Bao et al. |
| 2010/0322145 A1 | 12/2010 | Yu et al. |
| 2010/0322194 A1 | 12/2010 | Hu et al. |
| 2010/0323612 A1 | 12/2010 | Xu et al. |
| 2010/0323614 A1 | 12/2010 | Yu et al. |
| 2010/0323684 A1 | 12/2010 | Cai et al. |
| 2010/0325506 A1 | 12/2010 | Cai et al. |
| 2011/0026409 A1 | 2/2011 | Hu et al. |
| 2011/0041027 A1 | 2/2011 | Fong et al. |
| 2011/0044234 A1 | 2/2011 | Cai et al. |
| 2011/0092212 A1 | 4/2011 | Kubota |
| 2011/0110258 A1 | 5/2011 | Ishii et al. |
| 2011/0261763 A1 | 10/2011 | Chun et al. |
| 2011/0310897 A1 | 12/2011 | Cai et al. |
| 2011/0310912 A1 | 12/2011 | Cai et al. |
| 2011/0317648 A1 | 12/2011 | Lee et al. |
| 2012/0057560 A1 | 3/2012 | Park et al. |
| 2013/0094431 A1 | 4/2013 | Terry et al. |
| 2014/0286234 A1 | 9/2014 | Yu et al. |
| 2014/0362755 A1 | 12/2014 | Yu et al. |
| 2015/0163821 A1 | 6/2015 | Wu |

FOREIGN PATENT DOCUMENTS

| | | |
|---|---|---|
| CN | 101047431 A | 10/2007 |
| CN | 101141171 A | 3/2008 |
| CN | 101217337 A | 7/2008 |
| CN | 101222299 A | 7/2008 |
| CN | 101257492 A | 9/2008 |
| CN | 101296060 A | 10/2008 |
| EP | 1534035 A1 | 5/2005 |
| EP | 1773091 A2 | 4/2007 |
| EP | 1775983 A1 | 4/2007 |
| EP | 1883178 A2 | 1/2008 |
| EP | 1890402 A2 | 2/2008 |
| EP | 1919234 A2 | 5/2008 |
| EP | 1924009 A1 | 5/2008 |
| EP | 1940185 A1 | 7/2008 |
| EP | 1959708 A1 | 8/2008 |
| EP | 1995921 A2 | 11/2008 |
| EP | 2242306 A1 | 10/2010 |
| JP | 2004328665 A | 11/2004 |
| JP | 2006311253 A | 11/2006 |
| JP | 2007312244 A | 11/2007 |
| JP | 2008034335 A | 2/2008 |
| JP | 2008060951 A | 3/2008 |
| JP | 2008511210 A | 4/2008 |
| JP | 2008104096 A | 5/2008 |
| JP | 2008118499 A | 5/2008 |
| JP | 2008118500 A | 5/2008 |
| JP | 2008118651 A | 5/2008 |
| JP | 2008118652 A | 5/2008 |
| JP | 2008131649 A | 5/2008 |
| JP | 2008167141 A | 7/2008 |
| JP | 2008172754 A | 7/2008 |
| JP | 2008172759 | 7/2008 |
| JP | 2008537379 A | 9/2008 |
| JP | 2008271270 A | 11/2008 |
| JP | 2009520435 A | 5/2009 |
| JP | 2009521891 A | 6/2009 |
| JP | 2009524323 A | 6/2009 |
| JP | 2009182944 A | 8/2009 |
| JP | 2009188926 A | 8/2009 |
| JP | 2009531898 A | 9/2009 |
| JP | 2009539299 A | 11/2009 |
| JP | 2010504665 A | 2/2010 |
| JP | 2010506447 A | 2/2010 |
| JP | 2010103638 A | 5/2010 |
| JP | 2010136337 A | 6/2010 |
| WO | 0137590 A1 | 5/2001 |
| WO | 2005064872 A1 | 7/2005 |
| WO | 2006024321 A1 | 3/2006 |
| WO | 2007048247 A1 | 5/2007 |
| WO | 2007053950 A1 | 5/2007 |
| WO | 2007053954 A1 | 5/2007 |
| WO | 2007060731 A1 | 5/2007 |
| WO | 2007064249 A1 | 6/2007 |
| WO | 2007073121 A1 | 6/2007 |
| WO | 2007078142 A1 | 7/2007 |
| WO | 2007083230 A2 | 7/2007 |
| WO | 2007110447 A1 | 10/2007 |
| WO | 2007131347 A1 | 11/2007 |
| WO | 2008004806 A1 | 1/2008 |
| WO | 2008009228 A1 | 1/2008 |
| WO | 2008022132 A2 | 2/2008 |
| WO | 2008034335 A1 | 3/2008 |
| WO | 2008040930 A1 | 4/2008 |
| WO | 2008047870 A1 | 4/2008 |
| WO | 2008050961 A1 | 5/2008 |
| WO | 2008078365 A1 | 7/2008 |
| WO | 2008084949 A1 | 7/2008 |
| WO | 2008103981 A2 | 8/2008 |
| WO | 2008109912 A1 | 9/2008 |
| WO | 2008115826 A1 | 9/2008 |
| WO | 2008133307 A1 | 11/2008 |
| WO | 2008149979 A1 | 12/2008 |
| WO | 2009017005 A1 | 2/2009 |
| WO | 2009088172 A2 | 7/2009 |
| WO | 2009154038 A1 | 12/2009 |
| WO | 2010002100 A2 | 1/2010 |

OTHER PUBLICATIONS

Notice of Allowance dated Jun. 23, 2014; U.S. Appl. No. 13/716,839, filed Dec. 17, 2012; 10 pages.
Office Action dated Sep. 11, 2013; U.S. Appl. No. 13/842,584, filed Mar. 15, 2013; 55 pages.
Final Office Action dated Feb. 28, 2014; U.S. Appl. No. 13/842,584, filed Mar. 15, 2013; 9 pages.
Advisory Action dated Apr. 17, 2014; U.S. Appl. No. 13/842,584, filed Mar. 15, 2013; 2 pages.
Notice of Allowance dated Aug. 11, 2014; U.S. Appl. No. 13/842,584, filed Mar. 15, 2013; 30 pages.
Office Action dated Dec. 20, 2013; U.S. Appl. No. 13/865,810, filed Apr. 18, 2013; 72 pages.
Office Action dated May 16, 2014; U.S. Appl. No. 13/865,810, filed Apr. 18, 2013; 31 pages.
Final Office Action dated Sep. 17, 2014; U.S. Appl. No. 13/865,810, filed Apr. 18, 2013; 42 pages.
Office Action dated Oct. 16, 2014; U.S. Appl. No. 13/865,810, filed Apr. 18, 2013; 38 pages.
Final Office Action dated Mar. 23, 2015; U.S. Appl. No. 13/865,810, filed Apr. 18, 2013; 43 pages.
Advisory Action dated Jun. 12, 2015; U.S. Appl. No. 13/865,810, filed Apr. 18, 2013; 3 pages.
Notice of Allowance dated Jul. 24, 2015; U.S. Appl. No. 13/865,810, filed Apr. 18, 2013; 14 pages.
Office Action dated Oct. 19, 2015; U.S. Appl. No. 14/298,629, filed Jun. 6, 2014; 89 pages.
Office Action dated Sep. 10, 2015; U.S. Appl. No. 14/465,528, filed Aug. 21, 2014; 8 pages.
PCT International Search Report; PCT Application No. PCT/US2009/030967; dated Sep. 8, 2009; 5 pages.
PCT Written Opinion of the International Searching Authority; PCT Application No. PCT/US2009/030967; dated Sep. 8, 2009; 9 pages.
Australian Examination Report; Application No. 2009325082; dated Jul. 11, 2011; 2 pages.
Australian Examination Report; Application No. 2009325082; dated Mar. 28, 2012; 3 pages.
Canadian Office Action; Application No. 2,746,635; dated Apr. 18, 2013; 3 pages.

(56) References Cited

OTHER PUBLICATIONS

Canadian Office Action; Application No. 2,746,635; dated Jan. 14, 2014; 3 pages.
Canadian Office Action; Application No. 2,746,635; dated Jan. 22, 2015; 4 pages.
Chinese Office Action; Application No. 200980149651.4; dated Aug. 23, 2013, 14 pages.
Chinese Office Action as Received in Co-pending Application No. 200980149651.4 dated May 6, 2014; 3 pages. (No English translation available).
Chinese Office Action; Application No. 200980149651.4; dated Nov. 24, 2014; 12 pages.
Chinese Office Action; Application No. 200980149651.4; dated Jun. 5, 2015; 13 pages.
Japanese Office Action; Application No. 2011-540716; dated Oct. 4, 2012; 15 pages.
Japanese Office Action as Received in Co-pending Application No. 2011-540716 dated Dec. 13, 2013; 3 pages. (No English translation available).
Korean Office Action; Application No. 10-2011-7015882; dated Sep. 18, 2012; 10 pages.
Korean Office Action; Application No. 10-2011-7015882; dated Mar. 21, 2013; 7 pages.
PCT International Search Report; PCT Application No. PCT/US2009/062551; dated Jan. 28, 2010; 4 pages.
PCT Written Opinion of the International Searching Authority; PCT Application No. PCT/US2009/062551; dated Jan. 28, 2010; 5 pages.
Canadian Office Action; Application No. 2,747,593; dated May 24, 2013; 3 pages.
Canadian Office Action; Application No. 2,747,593; dated May 28, 2014; 4 pages.
Canadian Office Action; Application No. 2,747,593; dated Mar. 26, 2015; 3 pages.
PCT International Search Report; PCT Application No. PCT/US2009/062554; dated May 12, 2010; 6 pages.
PCT Written Opinion of the International Searching Authority; PCT Application No. PCT/US2009/062554; dated May 12, 2010; 7 pages.
Australian Office Action; Application No. 2009333788; dated Dec. 8, 2011; 3 pages.
Canadian Office Action; Application No. 2,747,339; dated May 1, 2013; 2 pages.
Canadian Office Action; Application No. 2,747,339; dated May 6, 2014; 2 pages.
Chinese Office Action; Application No. 200980156929.0; dated Aug. 1, 2013; 14 pages.
Chinese Office Action; Application No. 200980156929.0; dated Feb. 12, 2014; 13 pages.
Chinese Office Action; Application No. 200980156929.0; dated Sep. 2, 2014; 7 pages.
European Examination Report; Application No. 09748915.7 dated May 14, 2012; 3 pages.
Japanese Office Action; Application No. 2011-542161; dated Nov. 1, 2012; 17 pages.
Japanese Office Action; Application No. 2011-542161; dated Aug. 29, 2013; 7 pages.
Korean Office Action; Application No. 10-2011-7016626; dated Jul. 17, 2012; 7 pages.
Korean Office Action; Application No. 10-2011-7016626; dated Oct. 26, 2012; 8 pages.
Korean Office Action; Application No. 10-2011-7016626; dated May 20, 2013; 5 pages.
PCT International Search Report; PCT Application No. PCT/US2009/062557; dated Feb. 10, 2010; 4 pages.
Office Action dated Jun. 16, 2011; U.S. Appl. No. 12/340,412, filed Dec. 19, 2008; 33 pages.
Final Office Action dated Nov. 8, 2011; U.S. Appl. No. 12/340,412, filed Dec. 19, 2008; 19 pages.
Office Action dated Feb. 17, 2012; U.S. Appl. No. 12/340,412, filed Dec. 19, 2008; 19 pages.
Notice of Allowance dated Aug. 10, 2012; U.S. Appl. No. 12/340,412, filed Dec. 19, 2008; 17 pages.
Office Action dated Jul. 12, 2010, 40 pages, U.S. Appl. No. 12/337,207, filed Dec. 17, 2008.
Office Action dated Jan. 25, 2011, 39 pages, U.S. Appl. No. 12/337,207, filed Dec. 17, 2008.
Office Action dated Jul. 13, 2011; U.S. Appl. No. 12/337,207, filed Dec. 17, 2008; 34 pages.
Final Office Action dated Dec. 16, 2011; U.S. Appl. No. 12/337,207, filed Dec. 17, 2008; 37 pages.
Advisory Action dated Mar. 2, 2012; U.S. Appl. No. 12/337,207, filed Dec. 17, 2008; 3 pages.
Notice of Allowance dated Jun. 12, 2012; U.S. Appl. No. 12/337,207, filed Dec. 17, 2008; 20 pages.
Office Action dated Oct. 12, 2012; U.S. Appl. No. 13/548,817, filed Jul. 13, 2012; 53 pages.
Final Office Action dated Jan. 24, 2013; U.S. Appl. No. 13/548,817, filed Jul. 13, 2012; 33 pages.
Advisory Action dated Apr. 12, 2013; U.S. Appl. No. 13/548,817, filed Jul. 13, 2012; 8 pages.
Office Action dated Sep. 13, 2013; U.S. Appl. No. 13/548,817, filed Jul. 13, 2012; 37 pages.
Notice of Allowance dated Mar. 17, 2014; U.S. Appl. No. 13/548,817, filed Jul. 13, 2012; 33 pages.
Office Action dated Jul. 22, 2011; U.S. Appl. No. 12/337,235, filed Dec. 17, 2008; 36 pages.
Final Office Action dated Jan. 9, 2012; U.S. Appl. No. 12/337,235, filed Dec. 17, 2008; 26 pages.
Advisory Action dated Mar. 22, 2012; U.S. Appl. No. 12/337,235, filed Dec. 17, 2008; 10 pages.
Notice of Allowance dated Sep. 11, 2012; U.S. Appl. No. 12/337,235, filed Dec. 17, 2008; 16 pages.
Office Action dated May 26, 2010, 9 pages, U.S. Appl. No. 12/337,214, filed Dec. 17, 2008.
Notice of Allowance dated Nov. 8, 2010, 10 pages, U.S. Appl. No. 12/337,214, filed Dec. 17, 2008.
Notice of Allowance dated Mar. 25, 2011, 11 pages, U.S. Appl. No. 12/337,214, filed Dec. 17, 2008.
Notice of Allowance dated May 27, 2011; U.S. Appl. No. 12/337,214, filed Dec. 17, 2008; 10 pages.
Office Action dated Aug. 9, 2012; U.S. Appl. No. 12/916,214, filed Oct. 29, 2010; 51 pages.
Final Office Action dated Nov. 27, 2012; U.S. Appl. No. 12/916,214, filed Oct. 29, 2010; 16 pages.
Office Action dated Jul. 18, 2011; U.S. Appl. No. 12/340,432, filed Dec. 19, 2008; 6 pages.
Office Action dated Sep. 16, 2011; U.S. Appl. No. 12/340,432, filed Dec. 19, 2008; 33 pages.
Final Office Action dated Mar. 23, 2012; U.S. Appl. No. 12/340,432, filed Dec. 19, 2008; 28 pages.
Notice of Allowance dated Jun. 20, 2012; U.S. Appl. No. 12/340,432, filed Dec. 19, 2008; 23 pages.
Office Action dated Nov. 10, 2011; U.S. Appl. No. 13/216,819, filed Aug. 24, 2011; 19 pages.
Final Office Action dated Apr. 19, 2012; U.S. Appl. No. 13/216,819, filed Aug. 24, 2011; 39 pages.
Office Action dated Apr. 18, 2013; U.S. Appl. No. 13/216,819, filed Aug. 24, 2011; 37 pages.
Final Office Action dated Sep. 17, 2013; U.S. Appl. No. 13/216,819, filed Aug. 24, 2011; 22 pages.
Notice of Allowance dated Nov. 25, 2013; U.S. Appl. No. 13/216,819, filed Aug. 24, 2011; 16 pages.
Office Action dated Aug. 17, 2010, 25 pages, U.S. Appl. No. 12/337,222, filed Dec. 17, 2008.
Final Office Action dated Jan. 14, 2011, 16 pages, U.S. Appl. No. 12/337,222, filed Dec. 17, 2008.
Office Action dated Feb. 1, 2012; U.S. Appl. No. 12/337,222, filed Dec. 17, 2008; 20 pages.
Final Office Action dated Jun. 7, 2012; U.S. Appl. No. 12/337,222, filed Dec. 17, 2008; 16 pages.

(56) References Cited

OTHER PUBLICATIONS

Office Action dated Dec. 3, 2012; U.S. Appl. No. 12/337,222, filed Dec. 17, 2008; 24 pages.
Office Action dated May 29, 2013; U.S. Appl. No. 12/337,222, filed Dec. 17, 2008; 26 pages.
Final Office Action dated Nov. 20, 2013; U.S. Appl. No. 12/337,222, filed Dec. 17, 2008; 28 pages.
Office Action dated Jan. 31, 2013; U.S. Appl. No. 13/221,583, filed Aug. 30, 2011; 69 pages.
Office Action dated May 10, 2013; U.S. Appl. No. 13/221,583, filed Aug. 30, 2011; 21 pages.
Final Office Action dated Sep. 6, 2013; U.S. Appl. No. 13/221,583, filed Aug. 30, 2011; 23 pages.
Advisory Action dated Dec. 6, 2013; U.S. Appl. No. 13/221,583, filed Aug. 30, 2011; 3 pages.
Office Action dated Mar. 4, 2014; U.S. Appl. No. 13/221,583, filed Aug. 30, 2011; 33 pages.
Final Office Action dated Jul. 10, 2014; U.S. Appl. No. 13/221,583, filed Aug. 30, 2011; 19 pages.
Advisory Action dated Sep. 16, 2014; U.S. Appl. No. 13/221,583, filed Aug. 30, 2011; 18 pages.
Office Action dated Feb. 5, 2013; U.S. Appl. No. 13/221,584, filed Aug. 30, 2011; 65 pages.
Final Office Action dated May 14, 2013; U.S. Appl. No. 13/221,584, filed Aug. 30, 2011; 15 pages.
PCT Written Opinion of the International Searching Authority; PCT Application No. PCT/US2009/062557; dated Feb. 10, 2010; 7 pages.
Canadian Office Action; Application No. 2,747,625; dated May 3, 2013; 3 pages.
European Examination Report; Application No. 09761065.3; dated May 7, 2012; 4 pages.
European Examination Report; Application No. 09761065.3; dated May 16, 2013; 3 pages.
Chinese Office Action; Application No. 200980157135.6; dated Jul. 25, 2013; 13 pages.
Japanese Office Action; Application No. 2011-542162; dated Oct. 17, 2012; 10 pages.
Japanese Office Action; Application No. 2013-066527; dated Jan. 23, 2014; 4 pages.
PCT International Search Report; PCT Application No. PCT/US2009/062560; dated Mar. 1, 2010; 4 pages.
PCT Written Opinion of the International Searching Authority; PCT Application No. PCT/US2009/062560; dated Mar. 1, 2010; 7 pages.
Canadian Office Action; Application No. 2,747,343; dated May 24, 2013; 3 pages.
Chinese Office Action; Application No. 200980156891.7; dated Jul. 19, 2013; 34 pages.
Japanese Office Action; Application No. 2011-542163; dated Dec. 18, 2012; 7 pages.
Japanese Office Action; Application No. 2011-542163; dated Jul. 18, 2013; 10 pages.
PCT International Search Report; PCT Application No. PCT/US2009/062570; dated Feb. 22, 2010; 4 pages.
PCT Written Opinion of the International Searching Authority; PCT Application No. PCT/US2009/062570; dated Feb. 22, 2010; 8 pages.
Canadian Office Action; Application No. 2,750,828; dated Apr. 4, 2013; 4 pages.
Chinese Office Action; Application No. 200980156931.8; dated Jul. 3, 2013; 28 pages.
European Examination Report; Application No. 09756080.9; dated Jun. 15, 2012; 5 pages.
Japanese Office Action; Application No. 2011-542164; dated Oct. 26, 2012; 7 pages.
PCT International Search Report; PCT Application No. PCT/US2009/062571; dated Apr. 19, 2010; 6 pages.
PCT Written Opinion of the International Searching Authority; PCT Application No. PCT/US2009/062571; dated Apr. 19, 2010; 6 pages.
PCT International Preliminary Report on Patentability; PCT Application No. PCT/US2009/062571; dated Mar. 10, 2011; 8 pages.
Canadian Office Action; Application No. 2,747,349; dated Jul. 12, 2013; 3 pages.
Canadian Office Action; Application No. 2,747,349; dated Jun. 4, 2014; 3 pages.
Chinese Office Action; Application No. 200980156892.1; dated Jul. 23, 2013; 16 pages.
Chinese Office Action; Application No. 200980156892.1; dated Dec. 31, 2013; 16 pages.
Chinese Office Action; Application No. 200980156892.1; dated Apr. 2, 2014; 20 pages.
Japanese Office Action; Application No. 2011-542165; dated Oct. 26, 2012; 7 pages.
Japanese Office Action; Application No. 2011-542165; dated Jun. 20, 2013; 7 pages.
Japanese Office Action; Application No. 2011-542165; dated Nov. 6, 2013; 5 pages.
Korean Office Action; Application No. 10-2011-7016425; dated Oct. 30, 2012; 9 pages.
PCT International Search Report; PCT Application No. PCT/US2009/062574; dated Jul. 19, 2010; 6 pages.
PCT Written Opinion of the International Searching Authority; PCT Application No. PCT/US2009/062574; dated Jul. 19, 2010; 9 pages.
European Examination Report; Application No. 09752588.5; dated Aug. 28, 2015; 7 pages.
PCT International Search Report; PCT Application No. PCT/US2009/064398; dated Mar. 18, 2010; 5 pages.
PCT Written Opinion of the International Searching Authority; PCT Application No. PCT/US2009/064398; dated Mar. 18, 2010; 9 pages.
Canadian Office Action; Application No. 2,747,377; dated Aug. 19, 2013; 3 pages.
Chinese Office Action; Application No. 200980156928.6; dated Sep. 23, 2013; 15 pages.
Japanese Office Action; Application No. 2011-542177; dated Oct. 26, 2012; 10 pages.
Japanese Office Action; Application No. 2011-542177; dated Apr. 26, 2013; 12 pages.
Japanese Office Action as Received in Co-pending Application No. 2011-540716 dated Aug. 22, 2014; 2 pages. (No English translation available).
Soldani, David, et al.; Title: Wireless Relays for Broadband Access; IEEE Communications Magazine; Mar. 2008. pp. 58-66.
Office Action dated Mar. 2, 2016; U.S. Appl. No. 12/916,214, filed Oct. 29, 2010; 55 pages.
Final Office Action dated Mar. 24, 2016; U.S. Appl. No. 14/298,629, filed Jun. 6, 2014; 18 pages.
Notice of Allowance dated Feb. 24, 2016; U.S. Appl. No. 14/465,528, filed Aug. 21, 2014; 89 pages.
European Examination Report; Application No. 09789422.4; dated May 2, 2016; 7 pages.
Chinese Office Action as Received in Co-pending Application No. 200980156892.1 dated Feb. 15, 2015; 6 pages. (No English translation available).
Doppler, Klaus, et al.; "Assessment of Relay Based Deployment Concepts and Detailed Description of Multi-hop Capable RAN Protocols as Input for the Concept Group Work"; IST-4-027756 Winner II; D3.5.2 v1.0; Jun. 30, 2007; 24 pages.
Ericsson; TSG-RAN WG1 #53; Title: A Discussion on Some Technology Components for LTE-Advanced; R1-082024; Kansas City, Missouri; May 5-9, 2008; 11 pages.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 314 pages.
Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pages.
Motorola; Title: Classification of Relays; TSG-RAN WG1 #54; R1-083223; Jeju, South Korea; Aug. 18-22, 2008; 3 pages.

(56) References Cited

OTHER PUBLICATIONS

Pabst, Ralf et al.; Title: Relay-Based Deployment Concepts for Wireless and Mobile Broadband Radio; IEEE Communications Magazine; Sep. 2004; pp. 80-89.
3GPP TSG RAN WG1 Meeting #54; "Discussion on the Various Types of Relays"; R1-082397; Warsaw, Poland; Jun. 30-Jul. 4, 2008; 6 pages.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pages.
Qualcomm Europe; 3GPP TSG-RAN WG1 #54; Title: Operation of Relays in LTE-A; R1-083191; Jeju, S. Korea; Aug. 18-22, 2008; 5 pages.
3GPP TSG RAN WG1 Meeting #55; "L2 Relay Interference Mitigation"; R1-084102; Prague, Czech Republic; Nov. 10-14, 2008; 6 pages.
3GPP TSG RAN WG1 Meeting #55-bis; "Relay Control Signalling Resource Coordination"; R1-090027; Ljubljana, Slovenia; Jan. 12-16, 2009; 3 pages.
Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pages.
3GPP TSG RAN WG1 Meeting #54bis; "Decode and Forward Relays for E-UTRA Enhancements"; R1-083533; Prague, Czech Republic; Sep. 29-Oct. 3, 2008; 5 pages.
Parkvall, Stefan, et al.; "The Evolution of WCDMA Towards Higher Speed Downlink Packet Data Access"; IEEE VTC; May 6, 2001; 5 pages.
Rohde & Schwarz; "UMTS Long Term Evolution (LTE) Technology Introduction;" Application Note 1MA111; Sep. 2008; 55 pages.
3GPP TSG RAN WG3 Meeting #57; "Correction of Synchronization, Handover, Trace, eMBMS Architecture, and S1 Common Functions and Procedures"; R3-071695/R2-073880; Athens, Greece; Aug. 20-24, 2007; 108 pages.
3GPP TSG-RAN-WG1 Meeting #54bis; "Further Details and Considerations of Different Types of Relays"; R1-083712; Prague, Czech Republic; Sep. 29-Oct. 3, 2008; 6 pages.
Sendonaris, Andrew, et al.; "User Cooperation Diversity—Part I: System Description"; IEEE Transactions on communications; vol. 51, No. 11; Nov. 2003; 12 pages.
Sendonaris, Andrew, et al.; "User Cooperation Diversity—Part II: Implementation Aspects and Performance Analysis"; IEEE Transactions on Communications; vol. 51, No. 11; Nov. 2003; 10 pages.
Tao, Jeffrey Z., et al.; "Aggregation in 802.16j—Enhanced Concatenation and MPDU Construction"; IEEE C802.16j-06/178r2; Nov. 7, 2006; 18 pages.
Masato, Okuda, et al.; "MAC-PDU Reconstruction at RS"; IEEE C802.16j-07/022; Jan. 8, 2007; 3 pages.
Office Action dated Aug. 19, 2011; U.S. Appl. No. 12/331,992, filed Dec. 10, 2008; 52 pages.
Final Office Action dated Dec. 9, 2011; U.S. Appl. No. 12/331,992, filed Dec. 10, 2008; 24 pages.
Office Action dated Feb. 14, 2014; U.S. Appl. No. 12/331,992, filed Dec. 10, 2008; 81 pages.
Notice of Allowance dated Jun. 24, 2014; U.S. Appl. No. 12/331,992, filed Dec. 10, 2008; 10 pages.
Office Action dated Jul. 21, 2011; U.S. Appl. No. 12/340,418, filed Dec. 19, 2008; 34 pages.
Final Office Action dated Jan. 5, 2012; U.S. Appl. No. 12/340,418, filed Dec. 19, 2008; 22 pages.
Final Office Action dated Oct. 2, 2012; U.S. Appl. No. 12/340,418, filed Dec. 19, 2008; 29 pages.
Notice of Allowance dated Jan. 17, 2013; U.S. Appl. No. 12/340,418, filed Dec. 19, 2008; 25 pages.
Office Action dated Mar. 21, 2012; U.S. Appl. No. 12/337,229, filed Dec. 17, 2008; 49 pages.
Notice of Allowance dated Aug. 28, 2012; U.S. Appl. No. 12/337,229, filed Dec. 17, 2008; 6 pages.
Notice of Allowance dated Jul. 1, 2016; U.S. Appl. No. 12/916,214, filed Oct. 29, 2010; 12 pages.
Advisory Action dated Jun. 1, 2016; U.S. Appl. No. 14/298,629, filed Jun. 6, 2014; 6 pages.
Indian Examination Report; Application No. 4184/CHENP/2011; dated Feb. 27, 2017; 9 pages.
3GPP TR 36.814v0.4.1; 3rd Generation Partnership Project; Technical Specification Group Radio Access Network; Further Advancements for E-UTRA Physical Layer Aspects; Release 9; Feb. 2009; 31 pages.
3GPP TR 36.913 v1.0.0; 3rd Generation Partnership Project; Technical Specification Group Radio Access Network; Requirements for Further Advancements for E-UTRA (LTE-Advanced) Release 8; May 2008; 13 pages.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pages.
3GPP TS 36.300 V8.6.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Sep. 2008; 137 pages.
3GPP TS 36.304 v8.3.0; 3rd Generation Partnership Project; Technical Specification Group Radio Access Network; Evolved Universal Terrestrial Radio Access (E-UTRA); User Equipment (UE) Procedures in Idle Mode; Release 8; Sep. 2008; 28 pages.
3GPP TS 36.321 v8.3.0; 3rd Generation Partnership Project; Technical Specification Group Radio Access Network; Evolved Universal Terrestrial Radio Access (E-UTRA) Medium Access Control (MAC) Protocol Specification; Release 8; Sep. 2008; 36 pages.
3GPP TS 36.321 V8.1.0; 3rd Generation Partnership Project; Technical Specification Group Radio Access Network; Evolved Universal Terrestrial Radio Access (E-UTRA); Medium Access Control (MAC) Protocol Specification; Release 8; Mar. 2008; 30 pages, 178 pages Large, Specify Pages Pertain to Applicant's Inventions.
China Mobile, Vodafone, Huawei; TSG-RAN WG1 #54; Title: Application Scenarios for LTE-Advanced Relay; R1-082975; Jeju, Korea; Aug. 18-22, 2008; 7 pages.
Notice of Allowance dated Oct. 21, 2016; U.S. Appl. No. 14/298,629, filed Jun. 6, 2014; 14 pages.
European Examination Report; Application No. 09756368.8; dated Nov. 14, 2016; 5 pages.
Chinese Office Action; Application No. 201410272909.2; dated Jan. 23, 2017; 12 pages.
Chinese Office Action; Application No. 201410292932.8; dated Apr. 5, 2017; 9 pages.
European Examination Report; Application No. 09789422.4; dated May 3, 2017; 5 pages.
European Examination Report; Application No. 09748914.0; dated Jul. 10, 2017; 5 pages.

* cited by examiner

SYSTEM AND METHOD FOR RELAY NODE SELECTION

CROSS-REFERENCE TO RELATED APPLICATIONS

This application is a continuation of U.S. patent application Ser. No. 13/865,810 filed on Apr. 18, 2013 entitled, "System and Method for Relay Node Selection", which is a continuation of U.S. Pat. No. 8,446,856 issued on May 21, 2013 entitled, "System and Method for Relay Node Selection" Ser. No. 12/340,418, which are incorporated by reference herein as if reproduced in their entirety.

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" does not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
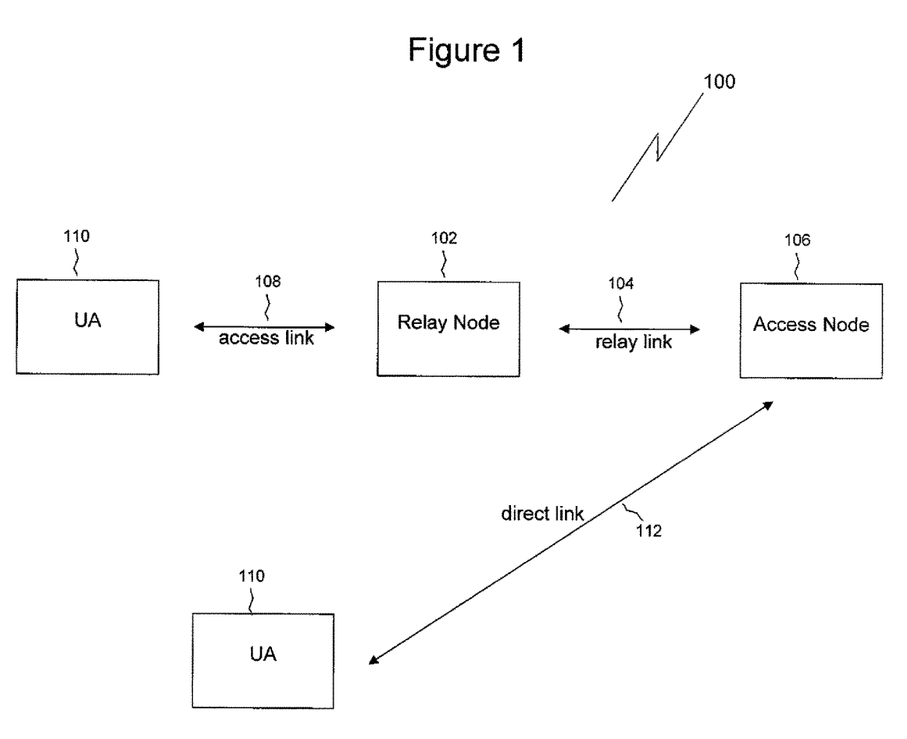
FIG. 1 is a diagram illustrating a wireless communication system that includes a relay node, according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks. Examples of wireless communication networks include LTE or LTE-Advanced (LTE-A) networks, and all of the disclosed and claimed embodiments could be implemented in an LTE-A network. The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110. The relay node 102 might be placed near the edges of a cell so that the UA 110 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate or a lower power transmission than the UA 110 might use when communicating directly with the access node 106 for that cell. Transmission at a higher data rate creates higher spectrum efficiency, and lower power benefits the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) or other relay node to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

Figure 2:
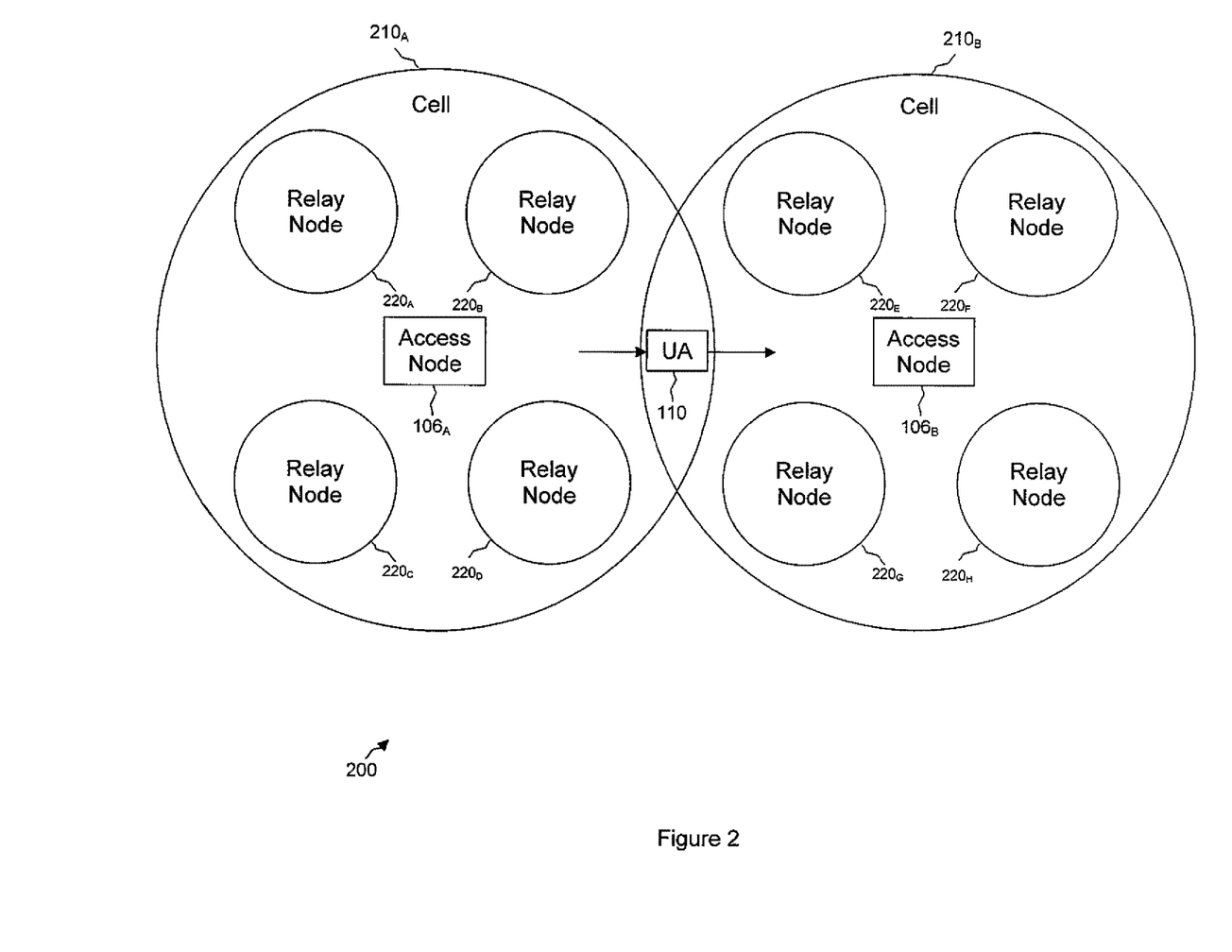
FIG. 2 is a diagram illustrating another wireless communication system that includes a relay node, according to an embodiment of the disclosure.

The UA 110 might be a mobile device that can move from one cell to another. FIG. 2 illustrates a system 200 in which the UA 110 is moving from a first cell $210_A$ covered by a first access node $106_A$ to a second cell $210_B$ covered by a second access node $106_B$. As the UA 110 moves from the first cell $210_A$ to the second cell $210_B$, the UA 110 might be handed over from the first access node $106_A$ to the second access node $106_B$. Also, as the UA 110 moves within one of the cells 210, the access node 106 for that cell 210 might cause the UA 110 to switch from one carrier to another, from one frequency to another, and/or from one radio access technology (RAT) to another.

Each of the cells 210 contains a plurality of relay nodes 220. While four relay nodes 220 are shown in each of the cells 210, other numbers of relay nodes 220 could be present, and while the areas covered by the relay nodes 220 are not depicted overlapping, the relay node coverage areas might overlap. When the UA 110 is attached to one of the access nodes 106 via one of the relay nodes 220 and moves out of the coverage area of that relay node 220, the UA 110 might need to attach to the same access node 106 via another relay node 220 or to another access node 106 via another relay node 220.

When a UA is in a cell that has relay nodes, it is sometimes preferable that the UA connect to the cell's access node via a relay node rather than over a direct link. U.S. patent application Ser. No. 12/331,992, filed Dec. 10, 2008, by James Earl Womack, et al, entitled "Method and Apparatus for Discovery of Relay Nodes", which is incorporated herein by reference as if reproduced in its entirety, discusses how a UA can discover that one or more relay nodes are nearby. The present disclosure deals with techniques for the UA to evaluate the discovered relay nodes and recommend a relay node to which the UA prefers to attach.

In an embodiment, the behavior of a moving UA differs depending on whether the UA is in the idle mode or in the connected mode. UA behavior in the idle mode will be considered first. The UA can save battery life by entering the idle mode in which it reduces its communications with an access node and monitors a signal that the access node provides. The UA can also monitor the power levels of other cells to determine whether it should reselect one of the other cells. An access node can page the UA when the access node needs to initiate communication with the UA, and the UA might then move from the idle mode (or idle state) to the connected mode (or connected state).

In an embodiment, while in the idle mode, the UA determines the signal strengths and related parameters of nearby relay nodes and uses this information to recommend which relay node the UA prefers to attach to when the UA moves from the idle mode to the connected mode. The UA sends its recommendation to an access node, and the access node can decide to accept or reject the recommendation.

The relay nodes may not send broadcast signals, but they typically do send reference symbols on the downlink to the UA. Two measurements have been standardized that measure the power of reference symbols. One is reference signal receive power (RSRP), and the other is reference signal receive quality (RSRQ). RSRP is a linear average of the received power of the cell-specific reference symbols. RSRQ is the ratio of RSRP and carrier received signal strength indication (RSSI).

In an embodiment, the UA does not use these measurements alone to evaluate the relay nodes. Instead, these measurements, or a subset thereof, might be combined with various parameters provided to the UA by an access node to derive a relay node selection rank. For example, the following parameters might be used in any combination to derive the relay node selection rank: an indication of preference or priority, a power offset value, a hysteresis value, an identifier of specific relay nodes, or any metadata about a relay node.

The preference or priority parameter can refer to a relay node that may be preferable for the UA to attach to, even when other nearby relay nodes have higher signal strengths or other parameters that may seem favorable. For example, a relay node in a high traffic area such as an airport terminal might have a higher signal strength than other nearby relay nodes. However, to prevent overloading the relay node, it may be preferable that some UAs attach to the other, lower power relay nodes. The relay node in the high traffic area might be assigned a preference or priority parameter that decreases the likelihood that a UA will attach to it.

The power offset parameter can refer to the difference in signal strength between two neighboring relay nodes. When other factors are not considered, a UA will generally tend to attach to a relay node that has a higher signal strength than nearby relay nodes. For example, when a UA attaches to a relay node, in one embodiment it is more efficient for the UA to stay in the current serving relay node unless a neighboring relay node can provide a higher signal strength. In order for the switch to the neighboring node to be worth the reconfiguration costs, the neighboring node's signal strength needs to be higher than the serving node's signal strength by a set amount, i.e., the power offset parameter. The power offset parameter can be set to zero in some cases.

The hysteresis value is a parameter that can prevent a UA from frequently switching back and forth between relay nodes. Due to vagaries in the strengths of relay node signals, a signal from one relay node that, at most times, is stronger than the signal from another relay node might occasionally be surpassed in strength by the other signal. If a UA always attached to the relay node with the higher signal strength, the UA might repeatedly alternate the relay node to which it attaches as the relay node with the higher signal strength alternates. To prevent this, a hysteresis value can be specified for a plurality of signal strengths such that a UA detaches from a first relay node and attaches to a second relay node only when the signal strength of the second relay node exceeds the signal strength of the first relay node for a specified number of consecutive measurements, throughout a specified length of time, or over some other hysteresis range. In one embodiment, when the signal strength of the neighboring node exceeds the signal strength of the serving node by the power offset for the time specified by the hysteresis value, the UA will detach from the serving node and attach to the neighboring node.

Upon determining the relay node power and receiving these parameters from an access node for a plurality of relay nodes, the UA can calculate a relay node selection rank for each of the relay nodes, determine the relay node with the highest relay node selection rank, and inform the access node that the UA would prefer to attach to the relay node with highest relay node selection rank upon leaving the idle mode. That is, an equation such as the following might be calculated in the UA for each nearby relay node:

$$RN\_Reselect(RN)=RSRP(RN)+Preference(RN)+PowerOffset(RN)+Hysteresis$$

where RN_Reselect(RN) is the relay node selection rank, RSRP(RN) is the measured relay node power, Preference (RN) is the preference or priority parameter for the relay node, PowerOffset(RN) is the power offset parameter for the relay node, and Hysteresis is the hysteresis parameter for the relay node. Although Preference(RN), PowerOffset(RN), and Hysteresis are described here to be associated with a particular relay node, other possibilities exist. For example, Preference(RN), PowerOffset(RN), and Hysteresis may be associated with the access node associated with the relay node.

Further, it should be understood that RN_Reselect(RN) is not necessarily calculated by a simple addition as shown in the equation, but might be some other combination of data related to one or more of RSRP(RN), Preference(RN), PowerOffset(RN), and Hysteresis. For example, any of these parameters might be converted to a measurement unit that is compatible with the other parameters, or any of these parameters might be multiplied by a weighting factor to give the parameter a greater or lesser significance. The weighting factor of any of the parameters could be set to zero, thus eliminating the parameter from consideration. That is, a subset of the parameters could be used. Also, in other embodiments, other factors might be considered than those above, or other combinations of factors might be considered. An access node might provide the Preference(RN), PowerOffset(RN), and Hysteresis values to the UA through RRC signaling or on a broadcast channel.

To save battery life, an idle UA typically communicates with the network only when the UA moves out of a location so that the UA can be paged if needed in its new location. However, this may not be an appropriate time to report relay node power levels and related information, since the reported power level information is only relevant when the UA moves into the connected mode from the idle mode. In an embodiment, the identity of the relay node that the UA prefers based on the RN_Reselect(RN) value is reported to the access node when the UA is changing from the idle mode to the connected mode. In an embodiment, the identity of the relay node is included in an RRC Connection Setup Complete message or another relevant RRC uplink message that the UA sends to the access node.

When the UA is in the connected mode, a similar relay node measurement procedure and relay node ranking procedure may be applied. This could be initiated by a Radio Resource Control message from the network node or by a mode change of the UA (i.e., switching from the idle mode to the connected mode). For example, when the UA switches from the idle mode to the connected mode, the UA could start to monitor nearby relay nodes and perform a relay node ranking procedure. The UA could then report the results to a network node, i.e., the access node. In one embodiment, the UA recommends a relay node to which to attach based on the ranking procedure and reports the recommended relay node to the access node. The access node may or may not override the UA's recommendation. In another embodiment, the UA reports the candidates and their relative ranking, and the access node selects the relay node to which the UA connects. In an embodiment, a Measurement Report message is used for the UA's reporting. In the connected mode, the UA may continue monitoring the relay nodes and perform the ranking procedure and update the recommended relay node. Alternatively, the UA may monitor the nearby relay nodes only when it switches from the idle mode to the connected mode.

In an embodiment, when the UA is in the connected mode and attached to a relay node, the UA is not handed over from the relay node to another relay node, another cell, another network, another frequency, or another RAT. Instead, the UA is first handed over from the relay node to the access node associated with the relay node. The access node then hands the UA over to the other relay node, cell, network, frequency, or RAT. When the UA is handed over to another relay node, the relay node to which the UA is handed over might be selected based on the relay node selection rank as described above. In an example signaling flow, the access node first sends a Measurement Control Message to the UA, which may include the IDs of the nearby relay nodes, measurement configurations, etc. Then the UA may perform the measurement procedures and, based on the ranking procedure, the UA may send a Handover Request message to the access node which may include the ID of the candidate relay node that the UA wishes to switch to. After the access node receives the Handover Request message, the access node may accept the relay node handover request and send a Handover Command to the UA. Then the UA may start to access the target relay node using the information provided in the Handover Command message.

In another embodiment, when the UA is in the connected mode, the UA is handed over from a relay node directly to another relay node, another cell, another network, another frequency, or another RAT. In an example signaling flow, after the UA performs the relay node ranking and a target relay node is selected, the UA may directly access the target relay node. After the target relay node receives an access message, the target relay node may notify the access node and, if the access node accepts the handover, the target relay node will send an access response to the UA indicating the successful relay handover.

Figure 3A:
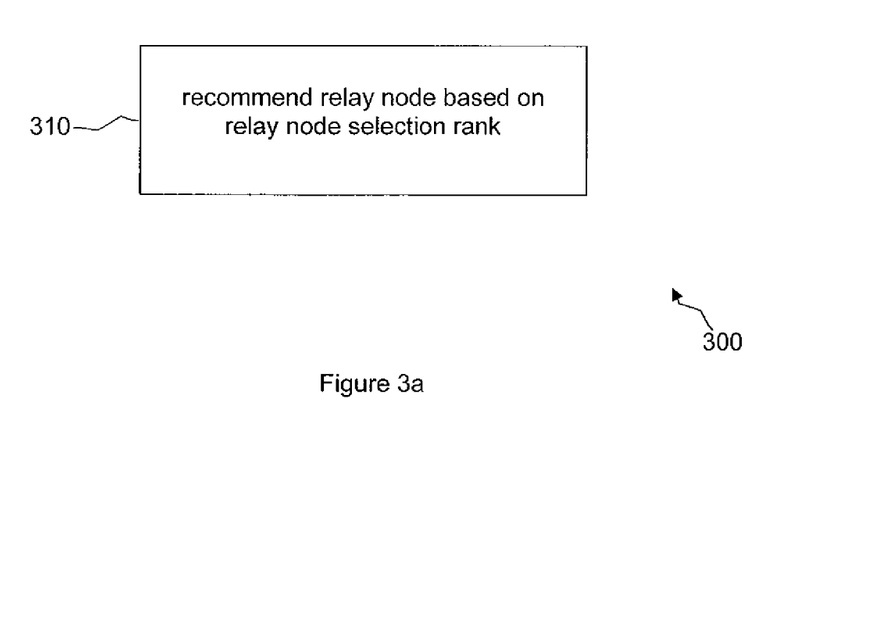
FIG. 3a is a block diagram of a method for recommending a relay node to which a user agent attaches according to an embodiment of the disclosure.

FIG. 3a illustrates an embodiment of a method 300 for recommending a relay node to which a UA attaches. In block 310, a relay node is recommended based on a relay node selection rank.

Figure 3B:
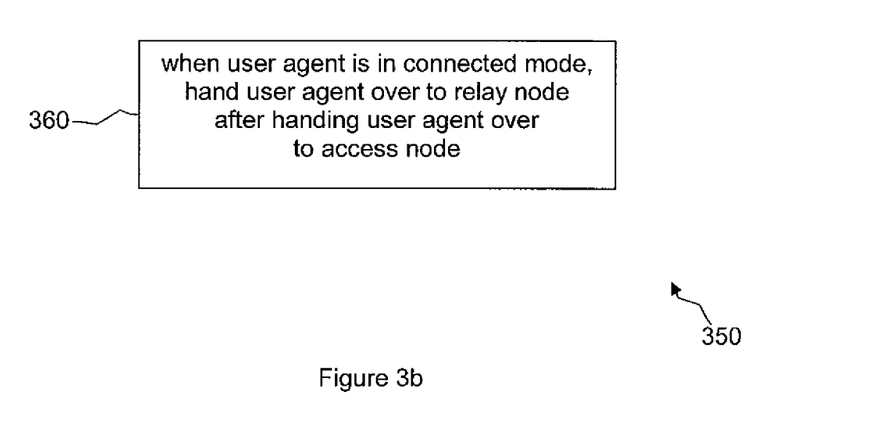
FIG. 3b is a block diagram of an alternative method for recommending a relay node to which a user agent attaches according to an embodiment of the disclosure.

FIG. 3b illustrates an embodiment of an alternative method 350 for recommending a relay node to which a UA attaches. In block 360, when the UA is in the connected mode, the UA is handed over to the relay node after the UA is handed over to an access node.

Figure 4:
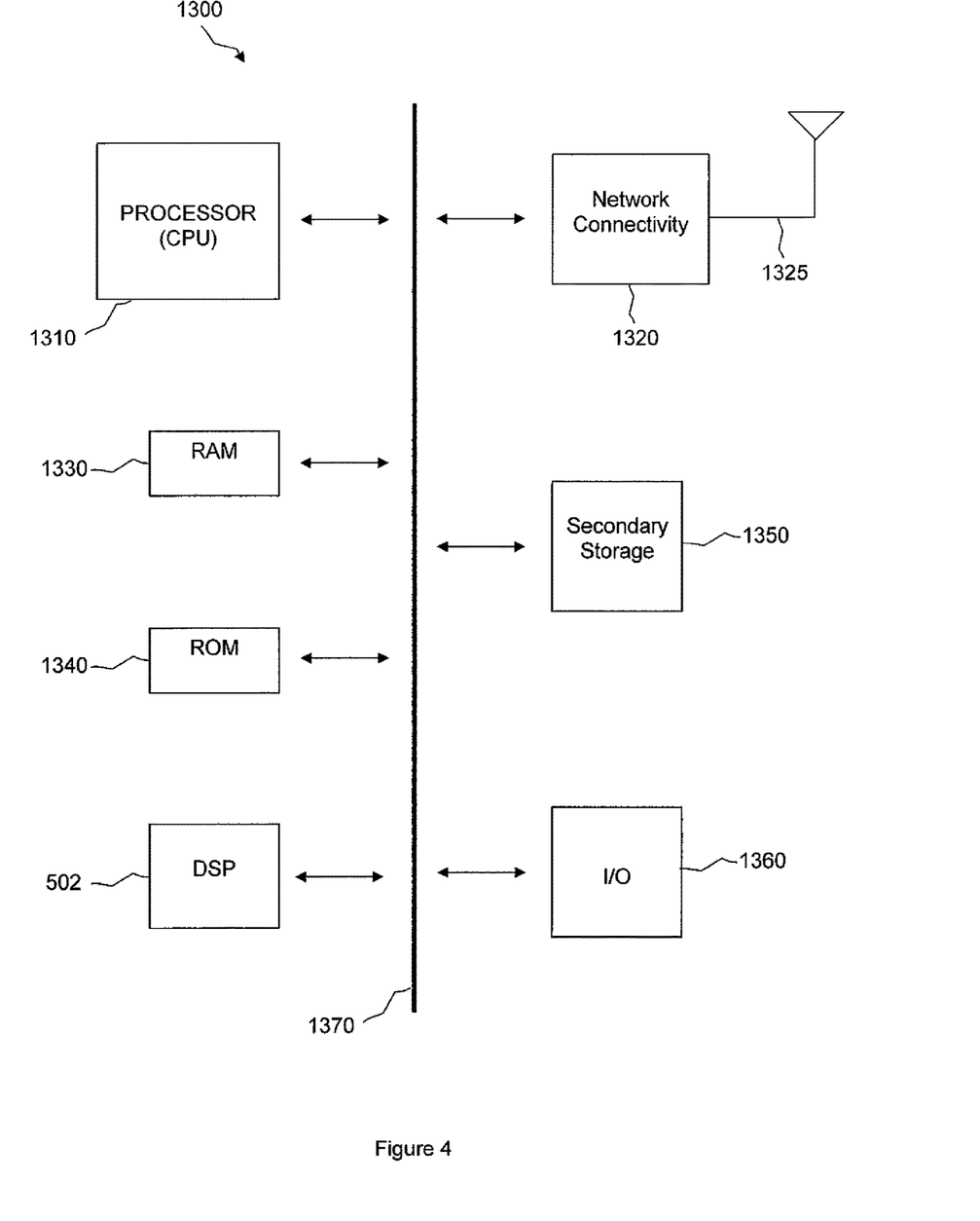
FIG. 4 illustrates a processor and related components suitable for implementing the several embodiments of the present disclosure.

The UA 110 and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 502. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

In an embodiment, a method is provided for recommending a relay node to which a user agent attaches. The method includes recommending the relay node based on a relay node selection rank.

In another embodiment, another method is provided for recommending a relay node to which a user agent attaches. The method includes, when the user agent is in a connected mode, handing the user agent over to the relay node after handing the user agent over to an access node.

In another embodiment, a user agent is provided that includes a processor configured to recommend a relay node based on a relay node selection rank.

In another embodiment, a wireless communication system is provided. The system includes a component configured to receive an identity of a relay node recommended based on a relay node selection rank and to promote attaching a user agent to the relay node.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for operating a user agent in a wireless communication network, the method comprising:
    establishing, by the user agent, a first communication link with a high transmission power network node;
    determining, by the user agent, downlink reference signal strength of a plurality of low transmission power network nodes, based on an instruction from the high transmission power network node;
    recommending, by the user agent, at least one low transmission power network node to the high transmission power network node, based on the determining, wherein the user agent informs the high transmission power network node of the recommendation in a Radio Resource Control (RRC) Connection Setup Complete message; and
    establishing, by the user agent, a second communication link with the at least one low transmission power network node, based on signaling from the high transmission power network node.

2. The method of claim 1, wherein the user agent informs the high transmission power network node of the recommendation in order to consume less of the user agent's battery power.

3. The method of claim 2, wherein the user agent accesses the at least one low transmission power network node via the second communication link at a lower power level than that used by the user agent to access the high transmission power network node via the first communication link.

4. The method of claim 1, wherein the user agent determines, while in an idle mode, downlink reference signal strength by measuring power levels of reference symbols received from the plurality of low transmission power network nodes, and wherein the user agent recommends the at least one low transmission power network node to the high transmission power network node when the user agent switches from the idle mode to a connected mode.

5. The method of claim 4, wherein measuring power levels comprises using at least one of a reference signal receive power (RSRP) or a reference signal receive quality (RSRQ).

6. The method of claim 1, further comprising:
    identifying a network node having a higher signal strength than the at least one low transmission power network node; and
    establishing a third communication link with the network node only if the signal strength of the network node is higher than the signal strength of the at least one low transmission power network node by a power offset parameter for at least two or more consecutive signal strength measurements.

7. The method of claim 1, wherein the user agent recommends a new low transmission power network node after establishing the second communication link with the at least one low transmission power network node based on a network node ranking procedure that occurs upon the user agent receiving a message from the high transmission power network node to trigger the network node ranking procedure.

8. The method of claim 7, wherein the user agent recommends the at least one low transmission power network node to the high transmission power network node when the user agent switches from an idle mode to a connected mode, and wherein the user agent recommends the new low transmission power network node upon performing the ranking procedure during the connected mode.

9. The method of claim 1, wherein the recommendation informs the high transmission power network node which of the plurality of low transmission power network nodes the user agent prefers to attach to upon leaving an idle mode.

10. The method of claim 9, further comprising establishing the second communication link with the at least one low transmission power network node in response to the user agent switching from the idle mode to a connected mode only if the high transmission power network node accepts the recommendation.

11. A user agent, comprising:
    a processor configured to:
        establish a first communication link with a high transmission power network node;
        determine downlink reference signal strength of a plurality of low transmission power network nodes, based on an instruction from the high transmission power network node;
        recommend at least one low transmission power network node to the high transmission power network node, based on the determining, wherein the user agent informs the high transmission power network node of the recommendation in a Radio Resource Control (RRC) Connection Setup Complete message; and
        establish a second communication link with the at least one low transmission power network node, based on signaling from the high transmission power network node.

12. The user agent of claim 11, wherein the user agent informs the high transmission power network node of the recommendation in order to consume less of the user agent's battery power.

13. The user agent of claim 12, wherein the user agent accesses the at least one low transmission power network node via the second communication link at a lower power level than used by the user agent to access the high transmission power network node via the first communication link.

14. The user agent of claim 11, wherein the user agent determines, while in an idle mode, downlink reference signal strength by measuring power levels of reference symbols received from the plurality of low transmission power network nodes, and wherein the user agent recommends the at least one low transmission power network node to the high transmission power network node upon switching from the idle mode to a connected mode.

15. The user agent of claim 14, wherein measuring power levels comprises using at least one of a reference signal receive power (RSRP) or a reference signal receive quality (RSRQ).

16. The user agent of claim 11, wherein the processor is further configured to:
    identify a network node having a higher signal strength than the at least one low transmission power network node; and
    establish a third communication link with the network node only if the signal strength of the network node is higher than the signal strength of the at least one low transmission power network node by a power offset parameter for at least two or more consecutive signal strength measurements.

17. The user agent of claim 11, wherein the user agent recommends a new low transmission power network node after establishing the second communication link with the at least one low transmission power network node based on a ranking procedure that is performed upon the user agent receiving a message from the high transmission power network node to trigger the ranking procedure.

18. The user agent of claim 17, wherein the user agent recommends the at least one low transmission power network node to the high transmission power network node when the user agent switches from an idle mode to a connected mode, and wherein the user agent recommends the new low transmission power network node upon performing the ranking procedure during the connected mode.

19. The user agent of claim 11, wherein the recommendation informs the high transmission power network node which of the plurality of low transmission power network nodes the user agent prefers to attach to upon leaving an idle mode.

20. The user agent of claim 19, wherein the user agent attaches to the at least one low transmission power network node upon switching from the idle mode to a connected mode only if the high transmission power network node accepts the recommendation.

* * * * *